United States Patent
Yamamoto et al.

(10) Patent No.: US 10,639,868 B2
(45) Date of Patent: May 5, 2020

(54) INTERMEDIATE FILM FOR LAMINATED GLASS, AND LAMINATED GLASS

(71) Applicant: SEKISUI CHEMICAL CO., LTD., Osaka, Osaka (JP)

(72) Inventors: Masaki Yamamoto, Kouka (JP); Kouhei Yamaguchi, Kouka (JP); Daisuke Nakajima, Kouka (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 54 days.

(21) Appl. No.: 15/129,738

(22) PCT Filed: Mar. 31, 2015

(86) PCT No.: PCT/JP2015/060268
§ 371 (c)(1),
(2) Date: Sep. 27, 2016

(87) PCT Pub. No.: WO2015/152301
PCT Pub. Date: Oct. 8, 2015

(65) Prior Publication Data
US 2017/0144413 A1    May 25, 2017

(30) Foreign Application Priority Data
Mar. 31, 2014 (JP) ................ 2014-074230

(51) Int. Cl.
B32B 17/10 (2006.01)
B32B 27/08 (2006.01)
B32B 27/20 (2006.01)
B32B 27/22 (2006.01)
B32B 27/42 (2006.01)
B32B 37/10 (2006.01)
C03C 27/10 (2006.01)

(52) U.S. Cl.
CPC .. B32B 17/10036 (2013.01); B32B 17/10678 (2013.01); B32B 17/10761 (2013.01); B32B 27/08 (2013.01); B32B 27/20 (2013.01); B32B 27/22 (2013.01); B32B 27/42 (2013.01); B32B 37/10 (2013.01); B32B 2250/03 (2013.01); B32B 2307/304 (2013.01); B32B 2307/54 (2013.01); B32B 2307/558 (2013.01); B32B 2307/71 (2013.01); B32B 2605/006 (2013.01)

(58) Field of Classification Search
CPC ....... B32B 37/10; B32B 37/26; B32B 37/144; B32B 17/10036; B32B 17/10761; B32B 17/10678; B32B 27/08; B32B 27/20; B32B 27/22; B32B 27/42; B32B 2250/03; B32B 2307/304; B32B 2307/54; B32B 2307/558; B32B 2307/07; B32B 2605/006
See application file for complete search history.

(56) References Cited

U.S. PATENT DOCUMENTS

| | | | |
|---|---|---|---|
| 4,952,457 A | | 8/1990 | Cartier et al. |
| 5,024,895 A | | 6/1991 | Kavanagh et al. |
| 5,091,258 A | | 2/1992 | Moran |
| 5,151,234 A | * | 9/1992 | Ishihara ............ B32B 17/10587 264/176.1 |
| 5,455,103 A | | 10/1995 | Hoagland et al. |
| 5,979,932 A | | 11/1999 | Jourdaine et al. |
| 2003/0035935 A1 | | 2/2003 | Wachi et al. |
| 2010/0285310 A1 | | 11/2010 | Izutani et al. |
| 2011/0097572 A1 | | 4/2011 | Yonekura et al. |
| 2011/0318578 A1 | | 12/2011 | Hashimoto et al. |
| 2013/0183532 A1 | | 7/2013 | Shimamoto et al. |
| 2013/0288061 A1 | * | 10/2013 | Kitano ............ B32B 17/10633 428/437 |
| 2014/0227489 A1 | | 8/2014 | Inui |

(Continued)

FOREIGN PATENT DOCUMENTS

CN    101918334 A    12/2010
CN    102066281 A    5/2011
(Continued)

OTHER PUBLICATIONS

Nakane et al. "Properties of poly(vinyl butyral)/TiO2 nanoconnposites formed by sol-gel process" Composites: Part B 35 (2004) 219-222 (Year: 2004).*

(Continued)

Primary Examiner — Melissa A Rioja
(74) Attorney, Agent, or Firm — Cheng Law Group, PLLC

(57) ABSTRACT

There is provided an interlayer film for laminated glass with which the adhesivity between a plastic layer and a resin layer can be heightened and the handling properties of laminated glass can be enhanced. The interlayer film for laminated glass according to the present invention includes a plastic layer with a Young's modulus of higher than or equal to 1 GPa and a first resin layer layered on a first surface of the plastic layer, and is provided with a second resin layer layered on a second surface opposite to the first surface of the plastic layer or is provided with no second resin layer on a second surface opposite to the first surface of the plastic layer, and when a first lamination interface between the plastic layer and the first resin layer on a section in the thickness direction of the interlayer film is observed, the proportion of the length of a portion, which is not brought into contact with the first resin layer, of the plastic layer in the first lamination interface to 100% of the whole length of the plastic layer in the first lamination interface is less than or equal to 75%.

14 Claims, 1 Drawing Sheet

(56) References Cited

U.S. PATENT DOCUMENTS

| | | |
|---|---|---|
| 2014/0327958 A1 | 11/2014 | Yoshimura et al. |
| 2016/0361905 A1* | 12/2016 | Yamaguchi ....... B32B 17/10036 |
| 2016/0368246 A1* | 12/2016 | Yamaguchi ....... B32B 17/10036 |

FOREIGN PATENT DOCUMENTS

| | | |
|---|---|---|
| EP | 3 112 325 A1 | 1/2004 |
| EP | 1 874 535 A1 | 1/2008 |
| EP | 2 347 898 A1 | 7/2011 |
| EP | 3 112 326 A1 | 1/2017 |
| JP | 5-507889 A | 11/1993 |
| JP | 6-500056 A | 1/1994 |
| JP | 10-86659 A | 4/1998 |
| JP | 2001-106556 A | 4/2001 |
| JP | 2001-130931 A | 5/2001 |
| JP | 2003-516921 A | 5/2003 |
| JP | 2003-192402 A | 7/2003 |
| JP | 2008-303084 A | 12/2008 |
| JP | 2009-161406 A | 7/2009 |
| JP | 2009-298661 A | 12/2009 |
| JP | 2010-99979 A | 5/2010 |
| JP | 2012-148915 A | 8/2012 |
| JP | 2013-6723 A | 1/2013 |
| WO | WO-01/43963 A1 | 6/2001 |
| WO | WO-2010/101211 A1 | 9/2010 |
| WO | WO-2013/031884 A1 | 3/2013 |
| WO | WO-2013/080987 A1 | 6/2013 |

OTHER PUBLICATIONS

Supplementary European Search Report for the Application No. EP 15 77 2811 dated Aug. 22, 2017.

International Search Report for the Application No. PCT/JP2015/060268 dated Jul. 7, 2015.

International Preliminary Report on Patentability (PCT/IPEA/409) for Application No. PCT/JP2015/060268 dated Jul. 19, 2016.

International Preliminary Report on Patentability (PCT/IPEA/409) for Application No. PCT/JP2015/060268 dated Jul. 19, 2016 (English Translation dated Oct. 27, 2016).

The First Office Action for the Application No. 201580016693.6 from The State Intellectual Property Office of the People's Republic of China dated Jul. 31, 2018.

European Office Action for the Application No. 15 772 811.4 dated Apr. 25, 2019.

Notification of Reasons for Refusal for the Application No. 2015-521163 from Japan Patent Office dated Apr. 16, 2019.

Indian Office Action for the Application No. 201637030971 dated Jun. 25, 2019.

* cited by examiner

[FIG. 1]
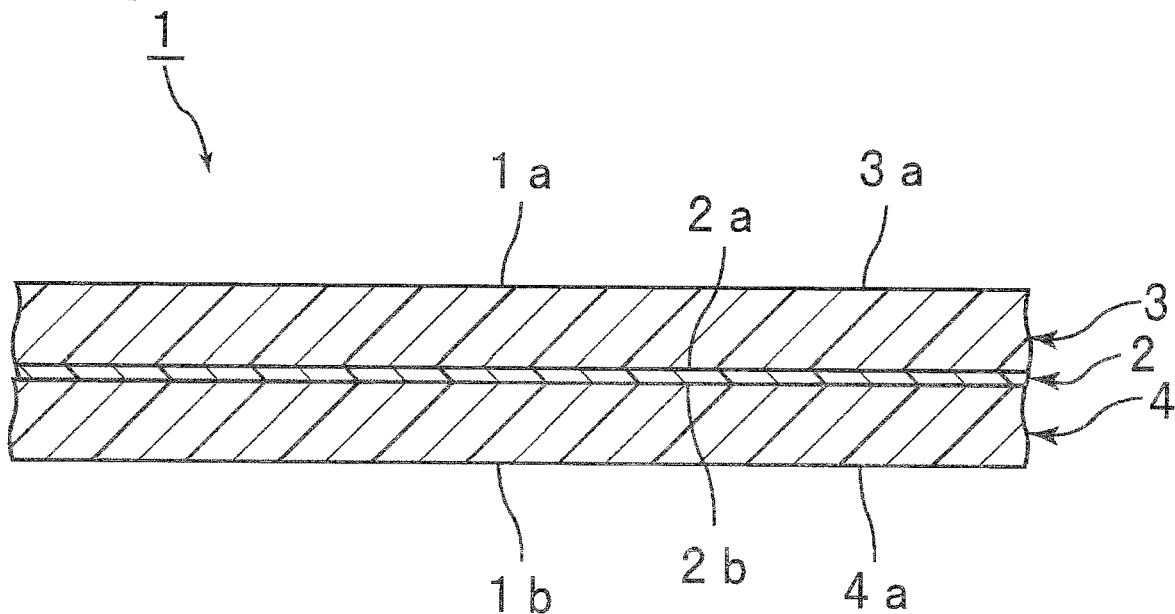
[FIG. 2]
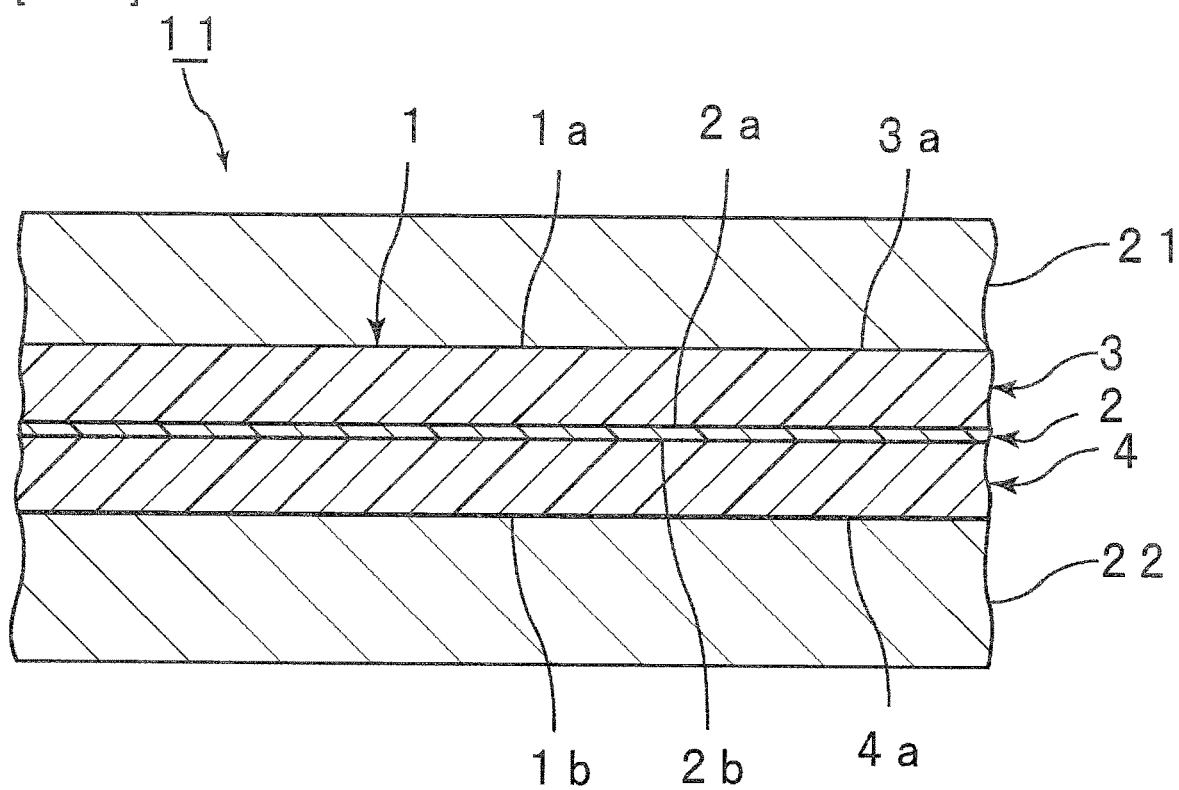

INTERMEDIATE FILM FOR LAMINATED GLASS, AND LAMINATED GLASS

TECHNICAL FIELD

The present invention relates to an interlayer film for laminated glass used for laminated glass. Moreover, the present invention relates to laminated glass prepared with the interlayer film for laminated glass.

BACKGROUND ART

Since laminated glass generates only a small amount of scattering glass fragments even when subjected to external impact and broken, laminated glass is excellent in safety. As such, the laminated glass is widely used for automobiles, railway vehicles, aircraft, ships, buildings and the like. The laminated glass is produced by sandwiching an interlayer film for laminated glass between a pair of glass plates. Laminated glass is required to be less liable to break even when subjected to external impact and is required to have an enhanced penetration resistance.

As an example of the interlayer film for laminated glass, the following Patent Document 1 discloses an interlayer film including two resin layers (A) which contain a transparent adhesive resin and a resin layer (B) which is arranged between the two resin layers (A) and contains polyethylene terephthalate.

The following Patent Document 2 discloses an interlayer film being a laminate formed of a plasticized polyvinyl acetal resin film or being a laminate formed of a plasticized polyvinyl acetal resin film and a polyester film.

The following Patent Document 3 discloses an interlayer film in which two or more kinds of layers differing in Young's modulus are layered. In Examples 1 and 2 of Patent Document 3, an interlayer film in which two kinds of layers A and B are layered so as to form a layered structure with a stack of A/B/A is described.

RELATED ART DOCUMENT

Patent Document

Patent Document 1: JP 2008-303084 A
Patent Document 2: JP 2001-106556 A
Patent Document 3: JP 2003-192402 A

SUMMARY OF THE INVENTION

Problems to be Solved by the Invention

In conventional interlayer films such as those described in the above-mentioned Patent Documents 1 to 3, there is a problem that the conventional interlayer film is low in processability at the time of preparing laminated glass. For example, there are cases where positional displacement occurs between the interlayer film and a glass plate.

Moreover, with regard to an interlayer film in which a plastic layer and a resin layer containing a polyvinyl acetal resin and the like are layered, there are cases where the interlayer film is low in adhesive force between the plastic layer and the resin layer. Furthermore, there is a problem that the plastic layer and the resin layer are easily peeled off from each other and the interlayer film is poor in handling properties.

An object of the present invention is to provide an interlayer film for laminated glass with which the adhesivity between a plastic layer and a resin layer can be heightened and the handling properties of laminated glass can be enhanced. Moreover, an object of the present invention is to provide laminated glass prepared with the above-mentioned interlayer film for laminated glass.

Means for Solving the Problems

According to a broad aspect of the present invention, there is provided an interlayer film for laminated glass including a plastic layer with a Young's modulus of higher than or equal to 1 GPa and a first resin layer layered on a first surface of the plastic layer, and being provided with a second resin layer layered on a second surface opposite to the first surface of the plastic layer or being provided with no second resin layer on a second surface opposite to the first surface of the plastic layer, wherein, when a first lamination interface between the plastic layer and the first resin layer on a section in the thickness direction of the interlayer film is observed, the proportion of the length of a portion, which is not brought into contact with the first resin layer, of the plastic layer in the first lamination interface to 100% of the whole length of the plastic layer in the first lamination interface is less than or equal to 75%.

In a specific aspect of the interlayer film for laminated glass according to the present invention, the Young's modulus of the plastic layer is higher than the Young's modulus of the first resin layer, and in the case where the interlayer film is provided with the second resin layer, the Young's modulus of the plastic layer is higher than the Young's modulus of the second resin layer.

In a specific aspect of the interlayer film for laminated glass according to the present invention, in the case where the interlayer film is provided with the second resin layer, when a second lamination interface between the plastic layer and the second resin layer on a section in the thickness direction of the interlayer film is observed, the proportion of the length of a portion, which is not brought into contact with the second resin layer, of the plastic layer in the second lamination interface to 100% of the whole length of the plastic layer in the second lamination interface is less than or equal to 75%.

It is preferred that the first resin layer contain a polyvinyl acetal resin and a plasticizer. Moreover, it is preferred that the second resin layer contain a polyvinyl acetal resin and a plasticizer.

In a specific aspect of the interlayer film for laminated glass according to the present invention, the first resin layer and the plastic layer are subjected to thermocompression bonding by a roll-to-roll process under conditions of a heating temperature of higher than or equal to 65° C. and lower than or equal to 150° C., a pressure at the time of compression bonding of greater than or equal to 0.1 kN and less than or equal to 5 kN and a tensile force at the time of transportation of less than or equal to 100 N.

In a specific aspect of the interlayer film for laminated glass according to the present invention, the interlayer film for laminated glass is provided with the second resin layer.

It is preferred that the first resin layer contain an ultraviolet ray screening agent. Moreover, it is preferred that the second resin layer contain an ultraviolet ray screening agent. It is preferred that the first resin layer contain an oxidation inhibitor. Moreover, it is preferred that the second resin layer contain an oxidation inhibitor.

According to a broad aspect of the present invention, there is provided laminated glass including a first laminated glass member, a second laminated glass member and an interlayer film for laminated glass described above, wherein the interlayer film for laminated glass is arranged between the first laminated glass member and the second laminated glass member.

Effect of the Invention

Since the interlayer film for laminated glass according to the present invention includes a plastic layer with a Young's modulus of higher than or equal to 1 GPa and a first resin layer layered on a first surface of the plastic layer, and is provided with a second resin layer layered on a second surface opposite to the first surface of the plastic layer or is provided with no second resin layer on a second surface opposite to the first surface of the plastic layer, and when a first lamination interface between the plastic layer and the first resin layer on a section in the thickness direction of the interlayer film is observed, the proportion of the length of a portion, which is not brought into contact with the first resin layer, of the plastic layer in the first lamination interface to 100% of the whole length of the plastic layer in the first lamination interface is less than or equal to 75%, it is possible to heighten the adhesivity between a plastic layer and a resin layer in the interlayer film and it is possible to enhance the handling properties of laminated glass.

BRIEF DESCRIPTION OF DRAWINGS

FIG. 1 is a sectional view showing an interlayer film for laminated glass in accordance with one embodiment of the present invention.

FIG. 2 is a sectional view showing laminated glass prepared with an interlayer film for laminated glass in accordance with one embodiment of the present invention.

MODE(S) FOR C PING OUT THE INVENTION

Hereinafter, the present invention will be described in detail.

(Interlayer Film for Laminated Glass)

The interlayer film for laminated glass according to the present invention includes a plastic layer and a first resin layer layered on a first surface of the plastic layer. The interlayer film for laminated glass according to the present invention is provided with a second resin layer layered on a second surface opposite to the first surface of the plastic layer or is provided with no second resin layer on a second surface opposite to the first surface of the plastic layer.

Accordingly, the interlayer film for laminated glass according to the present invention is an interlayer film (1) which is provided with a plastic layer and a first resin layer and is provided with no second resin layer or an interlayer film (2) which is provided with a first resin layer, a plastic layer and a second resin layer. The interlayer film for laminated glass according to the present invention may be the interlayer film (1) and may be the interlayer film (2).

The Young's modulus of the plastic layer is higher than or equal to 1 GPa. In the interlayer film for laminated glass according to the present invention, when a first lamination interface between the plastic layer and the first resin layer on a section in the thickness direction of the interlayer film is observed, the proportion of the length of a portion, which is not brought into contact with the first resin layer, (the proportion (1) of the length of the non-contact portion) of the plastic layer in the first lamination interface to 100% of the whole length of the plastic layer in the first lamination interface is less than or equal to 75%. In the present invention, the adhesion area (contact area) between the plastic layer and the first resin layer is remarkably increased as compared with a conventional interlayer film in which a plastic layer and a resin layer are layered.

By adopting the above-mentioned configuration in the present invention, it is possible to heighten the adhesivity between a plastic layer and a resin layer in the interlayer film and it is possible to enhance the handling properties of laminated glass. Moreover, it is possible to enhance the processability at the time of production of laminated glass prepared with the interlayer film. For example, at the time of production of laminated glass, since the exfoliation at an adhesion interface between the plastic layer and each of the first resin layer and the second resin layer does not occur when the interlayer film is transported onto a laminated glass member such as a glass plate and the interlayer film is allowed to be excellent in handling properties, the interlayer film is excellent in processability. Such effects are derived from high adhesive properties of the interface where exfoliation does not occur, as contrasted with low interface adhesive force with which, when a film is subjected to undulating movement at the time of transportation, exfoliation easily occurs by the movement. Furthermore, by adopting the above-mentioned configuration in the present invention, laminated glass prepared with the interlayer film hardly generates a large broken piece of glass even when broken, and it is possible to allow the resulting laminated glass to have a high level of safety. Such effects are derived from excellent impact relaxation properties at the time of breakage, which is attained by controlling the adhesive properties between layers.

In particular, at the time of allowing a plastic layer to have a high Young's modulus and allowing a resin layer having a Young's modulus lower than the Young's modulus of the plastic layer to be layered on the plastic layer or at the time of allowing an interlayer film to be arranged between laminated glass members, these layers and the interlayer film are poor in handling properties, the lamination requires much labor, and there tends to occur a problem on handling. Furthermore, positional displacement is also liable to occur. Moreover, in the case where a plastic layer and a resin layer are simply allowed to be strongly bonded together, there is a problem that laminated glass generates larger broken pieces of glass when broken. In contrast, by adopting the above-mentioned configuration in the present invention, it is possible to enhance the processability and allow laminated glass to generate smaller broken pieces of glass.

Moreover, in the present invention, it is also possible to enhance the penetration resistance of the resulting laminated glass. Furthermore, even if laminated glass is broken, it is possible to make the appearance of the laminated glass after being broken improved. For example, laminated glass is easily broken with a spider's web-like pattern of cracks, and laminated glass is hardly broken with a streak-like pattern of cracks. Moreover, by allowing laminated glass to be broken with a spider's web-like pattern of cracks without allowing laminated glass to be broken with a streak-like pattern of cracks, the possibility of causing a broken piece of glass to inflict a severe wound on a person or the like is further decreased and the laminated glass is allowed to have a higher level of safety.

From the viewpoints of further heightening the adhesivity between a plastic layer and a resin layer and further enhancing the handling properties of laminated glass, the proportion (1) of the length of the non-contact portion is preferably less than or equal to 70%, more preferably less than or equal to 60% and further preferably less than or equal to 50%. The proportion (1) of the length of the non-contact portion may be 0% (the whole portion is brought into contact with the first resin layer).

In the interlayer film for laminated glass according to the present invention, when a second lamination interface between the plastic layer and the second resin layer on a section in the thickness direction of the in interlayer film is observed, the proportion of the length of a portion, which is not brought into contact with the second resin layer, (the proportion (2) of the length of the non-contact portion) of the plastic layer in the second lamination interface to 100% of the whole length of the plastic layer in the second lamination interface is preferably less than or equal to 75%, more preferably less than or equal to 70%, further preferably less than or equal to 60% and especially preferably less than or equal to 50%. When the proportion (2) of the length of the non-contact portion is less than or equal to the above upper limit, the adhesivity between a plastic layer and a resin layer is further heightened and the handling properties of laminated glass are further enhanced. The proportion (2) of the length of the non-contact portion may be 0% (the whole portion is brought into contact with the second resin layer).

The proportion (1) of the length of the non-contact portion is measured in the following manner. An interlayer film is cut in the thickness direction to expose a section in the thickness direction. Next, the state of a first lamination interface between the plastic layer and the first resin layer exposed on the section is observed at 150 magnifications with a scanning electron microscope (SEM). The whole length of the plastic layer in the first lamination interface and the length of a portion, which is not brought into contact with the first resin layer, of the plastic layer in the first lamination interface are measured. The proportion of the length of a portion, which is not brought into contact with the first resin layer, (the proportion (1) of the length of the non-contact portion) of the plastic layer in the first lamination interface to 100% of the whole length of the plastic layer in the first lamination interface is determined. Moreover, in the same manner as that for the evaluation of the proportion (1) of the length of the non-contact portion, the proportion of the length of a portion, which is not brought into contact with the second resin layer, (the proportion (2) of the length of the non-contact portion) of the plastic layer in the second lamination interface to 100% of the whole length of the plastic layer in the second lamination interface is determined.

From the viewpoints of further heightening the adhesivity between a plastic layer and a resin layer and further enhancing the handling properties of laminated glass, it is preferred that the Young's modulus of the plastic layer be higher than the Young's modulus of the first resin layer. From the viewpoints of further heightening the adhesivity between a plastic layer and a resin layer and further enhancing the handling properties of laminated glass, in the case where the interlayer film is provided with the second resin layer, it is preferred that the Young's modulus of the plastic layer be higher than the Young's modulus of the second resin layer.

It is preferred that the interlayer film for laminated glass according to the present invention be provided with the second resin layer. In the case where the interlayer film is provided with the second layer, it is possible to further enhance the processability at the time of preparing laminated glass and effectively allow laminated glass to generate smaller broken pieces of glass at the time of breakage thereof.

From the viewpoints of further enhancing the processability at the time of preparing laminated glass and effectively allowing laminated glass to generate smaller broken pieces of glass at the time of breakage thereof, the Young's modulus of the plastic layer is preferably higher than or equal to 1.5 GPa, more preferably higher than or equal to 2 GPa. The Young's modulus is preferably lower than or equal to 10 GPa.

In this connection, in general, the Young's modulus of a resin layer containing a polyvinyl acetal resin and a plasticizer is lower than 1 GPa and specifically lower than or equal to 0.8 GPa. Accordingly, in general, the plastic layer with a Young's modulus of higher than or equal to 1 GPa is different from a resin layer containing a polyvinyl acetal resin and a plasticizer. The Young's modulus of the first resin layer is preferably lower than 1 GPa and more preferably lower than or equal to 0.8 GPa. The Young's modulus of the second resin layer is preferably lower than 1 GPa and more preferably lower than or equal to 0.8 GPa.

From the viewpoints of still further enhancing the processability at the time of preparing laminated glass and further effectively allowing laminated glass to generate smaller broken pieces of glass at the time of breakage thereof, the Young's modulus of the first resin layer is preferably lower than 0.6 GPa, more preferably lower than or equal to 0.1 GPa, further preferably lower than or equal to 0.05 GPa and especially preferably lower than or equal to 0.03 GPa. From the viewpoints of still further enhancing the processability at the time of preparing laminated glass and further effectively allowing laminated glass to generate smaller broken pieces of glass at the time of breakage thereof, the Young's modulus of the second resin layer is preferably lower than 0.6 GPa, more preferably lower than or equal to 0.1 GPa, further preferably lower than or equal to 0.05 GPa and especially preferably lower than or equal to 0.03 GPa.

From the viewpoints of further enhancing the processability at the time of preparing laminated glass and effectively allowing laminated glass to generate smaller broken pieces of glass at the time of breakage thereof, the Young's modulus of the plastic layer is preferably greater than 1.25 times, more preferably greater than or equal to 2 times, further preferably greater than or equal to 4 times, especially preferably greater than or equal to 400 times, most preferably greater than or equal to 700 times, preferably less than or equal to 3000 times, more preferably less than or equal to 2000 times and further preferably less than or equal to 1500 times the Young's modulus of each of the first resin layer and the second resin layer. The Young's modulus of the plastic layer may be less than or equal to 50 times and may be less than or equal to 10 times the Young's modulus of each of the first resin layer and the second resin layer. Also in this case, it is possible to enhance the processability at the time of preparing laminated glass and allow laminated glass to generate smaller broken pieces of glass at the time of breakage thereof.

The Young's moduli of the plastic layer, the first resin layer and the second resin layer are measured in the following manner.

The tensile test in accordance with JIS K7127 is performed to obtain a strain-stress curve at 23° C. The Young's modulus is defined by the inclination of a straight line portion of the strain-stress curve obtained.

From the viewpoints of further enhancing the processability at the time of preparing laminated glass and effectively allowing laminated glass to generate smaller broken pieces of glass at the time of breakage thereof, each of the adhesive force between the plastic layer and the first resin layer and the adhesive force between the plastic layer and the second resin layer is preferably greater than or equal to 1 N/50 mm, more preferably greater than or equal to 1.3 N/50 mm, still more preferably greater than or equal to 2 N/50 mm, further preferably greater than or equal to 3 N/50 mm, preferably less than or equal to 20 N/50 mm, more preferably less than or equal to 17.5 N/50 mm, still more preferably less than or equal to 15 N/50 mm and further preferably less than or equal to 10 N/50 mm. When the adhesive force is greater than or equal to the above lower limit, with regard to the interface between a plastic layer and a first resin layer and the interface between a plastic layer and a second resin layer, the adhesive properties thereof are further improved. When the adhesive force is less than or equal to the above upper limit, laminated glass hardly generates a large broken piece of laminated glass at the time of the penetration resistance test thereof, and the laminated glass is allowed to have a higher level of safety.

The adhesive force between the plastic layer and the first resin layer and the adhesive force between the plastic layer and the second resin layer are measured in the following manner.

Using the TENSILON universal material testing machine ("RTM-500" available from ORIENTEC CORPORATION), the adhesive force is measured at a speed of 500 mm/min at 23° C. in accordance with JIS K6854-2.

In the interlayer film for laminated glass according to the present invention, it is preferred that the plastic layer and the first resin layer be subjected to thermocompression bonding by a roll-to-roll process under conditions of a heating temperature of higher than or equal to 65° C. and lower than or equal to 150° C., a pressure at the time of compression bonding of greater than or equal to 0.1 kN and less than or equal to 5 kN and a tensile force at the time of transportation of less than or equal to 100 N. By allowing the interlayer film to be prepared by such thermocompression bonding, the adhesive force between the plastic layer and the first resin layer can be controlled within a suitable range.

In the interlayer film for laminated glass according to the present invention, it is preferred that the first resin layer, the plastic layer and the second resin layer be subjected to thermocompression bonding by a roll-to-roll process under conditions of a heating temperature of higher than or equal to 65° C. and lower than or equal to 150° C., a pressure at the time of compression bonding of greater than or equal to 0.1 kN and less than or equal to 5 kN and a tensile force at the time of transportation of less than or equal to 100 N. By allowing the interlayer film to be prepared by such thermocompression bonding, each of the adhesive force between the plastic layer and the first resin layer and the adhesive force between the plastic layer and the second resin layer can be controlled within a suitable range.

In this connection, the interlayer film for laminated glass according to the present invention can also be obtained by heating a first resin layer, arranging the first resin layer on the surface of a plastic layer, allowing the layers to pass through heated press rolls while maintaining the heating temperature for the first resin layer by means of the heated press rolls, and allowing the layers to be applied with a pressure and to be subjected to lamination pressing. Moreover, the interlayer film for laminated glass according to the present invention can also be obtained by heating a first resin layer and a second resin layer, arranging the first resin layer and the second resin layer on the surfaces of a plastic layer, allowing the layers to pass through heated press rolls while maintaining the heating temperature for the first resin layer and the second resin layer by means of the heated press rolls, and allowing the layers to be applied with a pressure and to be subjected to lamination pressing.

In an interlayer film which is provided with the first resin layer and is not provided with the second resin layer, the heating temperature refers to the heating temperature for the first resin layer. In an interlayer film which is provided with the first resin layer and the second resin layer, the heating temperature refers to the heating temperature for the first resin layer and the second resin layer. Provided that the heating temperature for the first resin layer and the heating temperature for the second resin layer each lie within the above-mentioned range, the heating temperature for the first resin layer and the heating temperature for the second resin layer may be the same as or different from each other.

Specifically, the interlayer film for laminated glass according to the present invention may have such a structure described below.

FIG. 1 shows an interlayer film for laminated glass used for laminated glass in accordance with one embodiment of the present invention schematically represented as a sectional view.

An interlayer film 1 shown in FIG. 1 is a multilayer interlayer film. The interlayer film 1 is used for obtaining laminated glass. The interlayer film 1 is an interlayer film for laminated glass. The interlayer film 1 is provided with a plastic layer 2, a first resin layer 3 layered on a first surface 2a of the plastic layer 2 and a second resin layer 4 layered on a second surface 2b opposite to the first surface 2a of the plastic layer 2. Each of the first resin layer 3 and the second resin layer 4 is directly layered on the plastic layer 2. The plastic layer 2 is an intermediate layer. In the present embodiment, the first resin layer 3 and the second resin layer 4 are surface layers. The plastic layer 2 is arranged between the first resin layer 3 and the second resin layer 4. The plastic layer 2 is sandwiched between the first resin layer 3 and the second resin layer 4. Accordingly, the interlayer film 1 has a multilayer structure in which the first resin layer 3, the plastic layer 2 and the second resin layer 4 are layered in this order. In this connection, without allowing a second resin layer 4 to be layered, an interlayer film in which a first resin layer 3 and a plastic layer 2 are layered may be obtained.

(Ingredients to be Blended for Plastic Layer)

[Thermoplastic Resin]

It is preferred that the plastic layer contain a thermoplastic resin. Examples of the thermoplastic resin contained in the plastic layer include linear polyolefins such as polyethylene, polypropylene, poly(4-methylpentene-1) and a polyacetal; alicyclic polyolefins such as a ring-opening metathesis polymer or an addition polymer of a kind of norbornene and an addition copolymer of a kind of norbornene and a kind of olefin; biodegradable polymers such as polylactic acid and polybutyl succinate; polyamides such as nylon 6, nylon 11, nylon 12 and nylon 66; aramid; polymethyl methacrylate, polyvinyl chloride, polyvinylidene chloride, polystyrene, polymethyl methacrylate-styrene copolymer, polycarbonate, polyesters such as polypropylene terephthalate, polyethylene terephthalate, polyethylene naphthalate, polybutylene terephthalate and polyethylene-2,6-naphthalate; polyether sulfone; polyether ether ketone; a modified polyphenylene ether; polyphenylene sulfide; polyether imide; polyimide; polyarylate; a polytetrafluoroethylene resin; a polytrifluoroethylene resin; a polychlorotrifluoroethylene resin; a tetrafluoroethylene-hexafluoropropylene copolymer; polyvinylidene fluoride and the like. One kind of the thermoplastic resin may be used alone, and two or more kinds thereof may be used in combination.

From the viewpoints of further enhancing the processability at the time of preparing laminated glass and effectively allowing laminated glass to generate smaller broken pieces of glass at the time of breakage thereof, it is preferred that the thermoplastic resin contained in the plastic layer be polyethylene terephthalate.

For the purpose of effectively heightening the Young's modulus, it is preferred that the plastic layer contain a thermoplastic resin other than the polyvinyl acetal resin, and it is preferred that the plastic layer not contain a polyvinyl acetal resin. In the case where the plastic layer contains a polyvinyl acetal resin, the content of the polyvinyl acetal resin in 100% by weight of the plastic layer is preferably less than or equal to 20% by weight, more preferably less than or equal to 10% by weight and further preferably less than or equal to 5% by weight.

For the purpose of effectively heightening the Young's modulus, it is preferred that the plastic layer not contain a plasticizer. In the case where the plastic layer contains a plasticizer, the content of the plasticizer in 100% by weight of the plastic layer is preferably less than or equal to 20% by weight, more preferably less than or equal to 10% by weight and further preferably less than or equal to 5% by weight.

[Other Ingredients]

It is preferred that the plastic layer contain an ultraviolet ray screening agent, and it is preferred that the plastic layer contain an oxidation inhibitor. In this connection, the kind of each of the ultraviolet ray screening agent and the oxidation inhibitor which can be used in the plastic layer is the same as each of the ultraviolet ray screening agent and the oxidation inhibitor which can be used in the first resin layer and the second resin layer described below.

The plastic layer may include additives such as a light stabilizer, a flame retardant, an antistatic agent, a pigment, a dye, an adhesive force regulating agent, a moisture-resistance improving agent and a fluorescent brightening agent, as necessary. One kind of these additives may be used alone, and two or more kinds thereof may be used in combination.

(Ingredients to be Blended for First Resin Layer and Second Resin Layer)

[Thermoplastic Resin]

It is preferred that each of the first resin layer and the second resin layer contain a thermoplastic resin. The thermoplastic resin is not particularly limited. As the thermoplastic resin, a conventionally known thermoplastic resin can be used. One kind of the thermoplastic resin may be used alone, and two or more kinds thereof may be used in combination. The thermoplastic resin in the first resin layer and the thermoplastic resin in the second resin layer may be the same as or different from each other.

Examples of the thermoplastic resin include a polyvinyl acetal resin, an ethylene-vinyl acetate copolymer resin, an ethylene-acrylic acid copolymer resin, a polyurethane resin, a polyvinyl alcohol resin, and the like. Thermoplastic resins other than these may be used.

It is preferred that the thermoplastic resin be a polyvinyl acetal resin. By using a polyvinyl acetal resin and a plasticizer together, the adhesive force of each of the first resin layer and the second resin layer to a laminated glass member and another layer such as a plastic layer is further heightened.

For example, the polyvinyl acetal resin can be produced by acetalizing polyvinyl alcohol with an aldehyde. For example, the polyvinyl alcohol can be produced by saponifying polyvinyl acetate. The saponification degree of the polyvinyl alcohol generally lies within the range of 70 to 99.8% by mole.

The average polymerization degree of the polyvinyl alcohol is preferably greater than or equal to 200, more preferably greater than or equal to 500, preferably less than or equal to 5000, more preferably less than or equal to 4000, further preferably less than or equal to 3500, especially preferably less than or equal to 3000 and most preferably less than or equal to 2500. When the average polymerization degree is greater than or equal to the above lower limit, the penetration resistance of laminated glass is further enhanced. When the average polymerization degree is less than or equal to the above upper limit, formation of an interlayer film is facilitated. In this connection, the average polymerization degree of the polyvinyl alcohol is determined by a method in accordance with JIS K6726 "Testing methods for polyvinyl alcohol".

The number of carbon atoms of the acetal group contained in the polyvinyl acetal resin is not particularly limited. The aldehyde used at the time of producing the polyvinyl acetal resin is not particularly limited. It is preferred that the number of carbon atoms of the acetal group in the polyvinyl acetal resin be 3 or 4. When the number of carbon atoms of the acetal group in the polyvinyl acetal resin is greater than or equal to 3, the glass transition temperature of the interlayer film is sufficiently lowered.

The aldehyde is not particularly limited. In general, an aldehyde with 1 to 10 carbon atoms is suitably used as the above-mentioned aldehyde. Examples of the aldehyde with 1 to 10 carbon atoms include propionaldehyde, n-butyraldehyde, isobutyraldehyde, n-valeraldehyde, 2-ethylbutyraldehyde, n-hexylaldehyde, n-octylaldehyde, n-nonylaldehyde, n-decylaldehyde, formaldehyde, acetaldehyde, benzaldehyde, and the like. Of these, propionaldehyde, n-butyraldehyde, isobutyraldehyde, n-hexylaldehyde or n-valeraldehyde is preferred, propionaldehyde, n-butyraldehyde or isobutyraldehyde is more preferred, and n-butyraldehyde is further preferred. One kind of the aldehyde may be used alone, and two or more kinds thereof may be used in combination.

The content of the hydroxyl group (the amount of hydroxyl groups) of the polyvinyl acetal resin is preferably greater than or equal to 15% by mole, more preferably greater than or equal to 18% by mole, further preferably greater than or equal to 20% by mole, especially preferably greater than or equal to 28% by mole, preferably less than or equal to 40% by mole, more preferably less than or equal to 35% by mole and further preferably less than or equal to 32% by mole. When the content of the hydroxyl group is greater than or equal to the above lower limit, the adhesive force of the interlayer film is further heightened. Moreover, when the content of the hydroxyl group is less than or equal to the above upper limit, the flexibility of the interlayer film is enhanced and the handling of the interlayer film is facilitated.

The content of the hydroxyl group of the polyvinyl acetal resin is a mole fraction, represented in percentage, obtained by dividing the amount of ethylene groups to which the hydroxyl group is bonded by the total amount of ethylene groups in the main chain. For example, the amount of ethylene groups to which the hydroxyl group is bonded can be measured in accordance with JIS K6726 "Testing methods for polyvinyl alcohol" to be determined.

The acetylation degree (the amount of acetyl groups) of the polyvinyl acetal resin is preferably greater than or equal to 0.1% by mole, more preferably greater than or equal to 0.3% by mole, further preferably greater than or equal to 0.5% by mole, preferably less than or equal to 30% by mole, more preferably less than or equal to 25% by mole, further preferably less than or equal to 20% by mole, especially preferably less than or equal to 15% by mole and most preferably less than or equal to 3% by mole. When the acetylation degree is greater than or equal to the above lower limit, the compatibility between the polyvinyl acetal resin and a plasticizer is heightened. When the acetylation degree is less than or equal to the above upper limit, with regard to the interlayer film and laminated glass, the moisture resistance thereof is enhanced.

The acetylation degree is a mole fraction, represented in percentage, obtained by dividing a value obtained by subtracting the amount of ethylene groups to which the acetal group is bonded and the amount of ethylene groups to which the hydroxyl group is bonded from the total amount of ethylene groups in the main chain by the total amount of ethylene groups in the main chain. For example, the amount of ethylene groups to which the acetal group is bonded can be measured in accordance with JIS K6728 "Testing methods for polyvinyl butyral".

The acetalization degree of the polyvinyl acetal resin (the butyralization degree in the case of a polyvinyl butyral resin) is preferably greater than or equal to 60% by mole, more preferably greater than or equal to 63% by mole, preferably less than or equal to 85% by mole, more preferably less than or equal to 75% by mole and further preferably less than or equal to 70% by mole. When the acetalization degree is greater than or equal to the above lower limit, the compatibility between the polyvinyl acetal resin and a plasticizer is heightened. When the acetalization degree is less than or equal to the above upper limit, the reaction time required for producing the polyvinyl acetal resin is shortened.

The acetalization degree is a mole fraction, represented in percentage, obtained by dividing the amount of ethylene groups to which the acetal group is bonded by the total amount of ethylene groups in the main chain.

The acetalization degree can be calculated by a method in accordance with JIS K6728 "Testing methods for polyvinyl butyral".

In this connection, it is preferred that the content of the hydroxyl group (the amount of hydroxyl groups), the acetalization degree (the butyralization degree) and the acetylation degree be calculated from the results measured by a method in accordance with JIS K6728 "Testing methods for polyvinyl butyral". In the case where the polyvinyl acetal resin is a polyvinyl butyral resin, it is preferred that the content of the hydroxyl group (the amount of hydroxyl groups), the acetalization degree (the butyralization degree) and the acetylation degree be calculated from the results measured by a method in accordance with JIS K6728 "Testing methods for polyvinyl butyral".

[Plasticizer]

It is preferred that the first resin layer contain a plasticizer. It is preferred that the second resin layer contain a plasticizer. In the case where the thermoplastic resin in each of the first resin layer and the second resin layer is a polyvinyl acetal resin, it is especially preferred that each of the first resin layer and the second resin layer contain a plasticizer. By the use of the plasticizer, the adhesive force of each of the first resin layer and the second resin layer is further heightened.

The plasticizer is not particularly limited. As the plasticizer, a conventionally known plasticizer can be used. One kind of the plasticizer may be used alone, and two or more kinds thereof may be used in combination.

Examples of the plasticizer include organic ester plasticizers such as a monobasic organic acid ester and a polybasic organic acid ester, phosphate plasticizers such as an organic phosphate plasticizer and an organic phosphite plasticizer, and the like. Of these, organic ester plasticizers are preferred. It is preferred that the plasticizer be a liquid plasticizer.

The monobasic organic acid ester is not particularly limited and examples thereof include a glycol ester obtained by the reaction of a glycol with a monobasic organic acid, an ester of triethylene glycol or tripropylene glycol and a monobasic organic acid, and the like. Examples of the glycol include triethylene glycol, tetraethylene glycol, tripropylene glycol, and the like. Examples of the monobasic organic acid include butyric acid, isobutyric acid, caproic acid, 2-ethylbutyric acid, hepthylic acid, n-octylic acid, 2-ethylhexanoic acid, n-nonylic acid, decylic acid, and the like.

The polybasic organic acid ester is not particularly limited and examples thereof include an ester compound of a polybasic organic acid and an alcohol having a linear or branched structure of 4 to 8 carbon atoms. Examples of the polybasic organic acid include adipic acid, sebacic acid, azelaic acid and the like.

The organic ester plasticizer is not particularly limited and examples thereof include triethylene glycol di-2-ethylbutyrate, triethylene glycol di-2-ethylhexanoate, triethylene glycol dicaprylate, triethylene glycol di-n-octanoate, triethylene glycol di-n-heptanoate, tetraethylene glycol di-n-heptanoate, dibutyl sebacate, dioctyl azelate, dibutyl carbitol adipate, ethylene glycol di-2-ethylbutyrate, 1,3-propylene glycol di-2-ethylbutyrate, 1,4-butylene glycol di-2-ethylbutyrate, diethylene glycol di-2-ethylbutyrate, diethylene glycol di-2-ethylhexanoate, dipropylene glycol di-2-ethylbutyrate, triethylene glycol di-2-ethylpentanoate, tetraethylene glycol di-2-ethylbutyrate, diethylene glycol dicapryate, dihexyl adipate, dioctyl adipate, hexyl cyclohexyl adipate, a mixture of heptyl adipate and nonyl adipate, diisononyl adipate, diisodecyl adipate, heptyl nonyl adipate, dibutyl sebacate, oil-modified sebacic acid alkyd, a mixture of a phosphoric acid ester and an adipic acid ester, and the like. Organic ester plasticizers other than these may be used.

The organic phosphate plasticizer is not particularly limited and examples thereof include tributoxyethyl phosphate, isodecyl phenyl phosphate, triisopropyl phosphate and the like.

It is preferred that the plasticizer be a diester plasticizer represented by the following formula (1).

[Chemical 1]

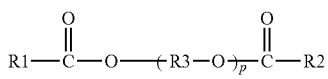

Formula (1)

In the foregoing formula (1), R1 and R2 each represent an organic group with 2 to 10 carbon atoms, R3 represents an ethylene group, an isopropylene group or an n-propylene group, and p represents an integer of 3 to 10. It is preferred that R1 and R2 in the foregoing formula (1) each be an organic group with 5 to 10 carbon atoms, and it is more preferred that R1 and R2 each be an organic group with 6 to 10 carbon atoms.

It is preferred that the plasticizer include at least one kind among triethylene glycol di-2-ethylhexanoate (3GO) and triethylene glycol di-2-ethylbutyrate (3GH), and it is more preferred that the plasticizer include triethylene glycol di-2-ethylhexanoate, The content of the plasticizer is not particularly limited. In each of the first resin layer and the second resin layer, relative to 100 parts by weight of the thermoplastic resin, the content of the plasticizer is preferably greater than or equal to 15 parts by weight, more preferably greater than or equal to 20 parts by weight, further preferably greater than or equal to 25 parts by weight, especially preferably greater than or equal to 30 parts by weight, most preferably greater than or equal to 35 parts by weight, preferably less than or equal to 75 parts by weight, more preferably less than or equal to 60 parts by weight, further preferably less than or equal to 50 parts by weight, especially preferably less than or equal to 45 parts by weight and most preferably less than or equal to 40 parts by weight. When the content of the plasticizer is greater than or equal to the above lower limit, the penetration resistance of laminated glass is further enhanced. When the content of the plasticizer is less than or equal to the above upper limit, the transparency of the interlayer film is further enhanced. From the viewpoints of further enhancing the processability at the time of preparing laminated glass and effectively allowing laminated glass to generate smaller broken pieces of glass at the time of breakage thereof, the content of the plasticizer is preferably greater than or equal to 25 parts by weight, more preferably greater than or equal to 30 parts by weight and further preferably greater than or equal to 35 parts by weight.

[Heat Shielding Compound]

Ingredient X:

It is preferred that each of the first resin layer and the second resin layer contain a heat shielding compound. It is preferred that each of the first resin layer and the second resin layer contain at least one kind of Ingredient X among a phthalocyanine compound, a naphthalocyanine compound and an anthracyanine compound. It is preferred that each of the first resin layer and the second resin layer contain at least one kind of Ingredient X among a phthalocyanine compound, a naphthalocyanine compound and an anthracyanine compound or contain heat shielding particles described below. The Ingredient X is a heat shielding compound. By allowing the Ingredient X to be used in at least one layer among the whole interlayer film, infrared rays (heat rays) can be effectively cut off.

The Ingredient X is not particularly limited. As the Ingredient X, conventionally known phthalocyanine compound, naphthalocyanine compound and anthracyanine compound can be used. One kind of the Ingredient X may be used alone, and two or more kinds thereof may be used in combination.

Examples of the Ingredient X include phthalocyanine, a derivative of phthalocyanine, naphthalocyanine, a derivative of naphthalocyanine, anthracyanine, a derivative of anthracyanine, and the like. It is preferred that each of the phthalocyanine compound and the derivative of phthalocyanine have a phthalocyanine skeleton. It is preferred that each of the naphthalocyanine compound and the derivative of naphthalocyanine have a naphthalocyanine skeleton. It is preferred that each of the anthracyanine compound and the derivative of anthracyanine have an anthracyanine skeleton.

From the viewpoint of further heightening the heat shielding properties of the interlayer film and laminated glass, it is preferred that the Ingredient X be at least one kind selected from the group consisting of phthalocyanine, a derivative of phthalocyanine, naphthalocyanine and a derivative of naphthalocyanine, and it is more preferred that the Ingredient X be at least one kind among phthalocyanine and a derivative of phthalocyanine.

From the viewpoints of effectively enhancing the heat shielding properties and maintaining the visible light transmittance at a higher level over a long period of time, it is preferred that the Ingredient X contain vanadium atoms or copper atoms. It is preferred that the Ingredient X contain vanadium atoms and it is also preferred that the Ingredient X contain copper atoms. It is more preferred that the Ingredient X be at least one kind among phthalocyanine containing vanadium atoms or copper atoms and a derivative of phthalocyanine containing vanadium atoms or copper atoms. From the viewpoint of still further enhancing the heat shielding properties of the interlayer film and the laminated glass, it is preferred that the Ingredient X have a structural unit in which an oxygen atom is bonded to a vanadium atom.

In the case where the first resin layer or the second resin layer contains the Ingredient X, in 100% by weight of each of the first resin layer and the second resin layer, the content of the Ingredient X is preferably greater than or equal to 0.001% by weight, more preferably greater than or equal to 0.005% by weight, further preferably greater than or equal to 0.01% by weight, especially preferably greater than or equal to 0.02% by weight, preferably less than or equal to 0.2% by weight, more preferably less than or equal to 0.1% by weight, further preferably less than or equal to 0.05% by weight, especially preferably less than or equal to 0.04% by weight and most preferably less than or equal to 0.02% by weight. When the content of the Ingredient X in each of the first resin layer and the second resin layer is greater than or equal to the above lower limit and less than or equal to the above upper limit, the heat shielding properties are sufficiently heightened and the visible light transmittance is sufficiently heightened. For example, it is possible to make the visible light transmittance greater than or equal to 70%.

Heat Shielding Particles:

It is preferred that each of the first resin layer and the second resin layer contain heat shielding particles. The heat shielding particle is a heat shielding compound. By allowing a heat shielding compound to be used in at least one layer among the whole interlayer film, infrared rays (heat rays) can be effectively cut off.

From the viewpoint of further heightening the heat shielding properties of laminated glass, it is more preferred that the heat shielding particles be metal oxide particles. It is preferred that the heat shielding particle be a particle (a metal oxide particle) formed from an oxide of a metal. One kind of the heat shielding particles may be used alone, and two or more kinds thereof may be used in combination.

The energy amount of an infrared ray with a wavelength greater than or equal to 780 nm which is longer than that of visible light is small as compared with an ultraviolet ray. However, the thermal action of infrared rays is large, and once infrared rays are absorbed into a substance, heat is released from the substance. As such, infrared rays are generally called heat rays. By the use of the heat shielding particles, infrared rays (heat rays) can be effectively cut off. In this connection, the heat shielding particle means a particle capable of absorbing infrared rays.

Specific examples of the heat shielding particles include metal oxide particles such as aluminum-doped tin oxide particles, indium-doped tin oxide particles, antimony-doped tin oxide particles (ATO particles), gallium-doped zinc oxide particles (GZO particles), indium-doped zinc oxide particles (IZO particles), aluminum-doped zinc oxide particles (AZO particles), niobium-doped titanium oxide particles, sodium-doped tungsten oxide particles, cesium-doped tungsten oxide particles, thallium-doped tungsten oxide particles, rubidium-doped tungsten oxide particles, tin-doped indium oxide particles (ITO particles), tin-doped zinc oxide particles and silicon-doped zinc oxide particles, lanthanum hexaboride (LaB$_6$) particles, and the like. Heat shielding particles other than these may be used. Of these, since the heat ray shielding function is high, preferred are metal oxide particles, more preferred are ATO particles, GZO particles, IZO particles, ITO particles or tungsten oxide particles, and especially preferred are ITO particles or tungsten oxide particles. In particular, since the heat ray shielding function is high and the particles are readily available, preferred are tin-doped indium oxide particles (ITO particles), and also preferred are tungsten oxide particles.

The tungsten oxide particles are generally represented by the following formula (X1) or the following formula (X2). In the interlayer film for laminated glass according to the present invention, the tungsten oxide particles represented by the following formula (X1) or the following formula (X2) are suitably used.

$$W_yO_z \qquad \text{Formula (X1)}$$

In the foregoing formula (X1), W represents tungsten, O represents oxygen, and y and z satisfy the relation of 2.0<z/y<3.0.

$$M_xW_yO_z \qquad \text{Formula (X2)}$$

In the foregoing formula (X2), M represents at least one kind of element selected from the group consisting of H, He, an alkali metal, an alkaline earth metal, a rare earth element, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta and Re, W represents tungsten, O represents oxygen, and x, y and z satisfy the relations of 0.001≤x/y≤1 and 2.0<z/y≤3.0.

From the viewpoint of further heightening the heat shielding properties of the interlayer film and laminated glass, it is preferred that the tungsten oxide particles be metal-doped tungsten oxide particles. Examples of the "tungsten oxide particles" include metal-doped tungsten oxide particles. Specifically, examples of the metal-doped tungsten oxide particles include sodium-doped tungsten oxide particles, cesium-doped tungsten oxide particles, thallium-doped tungsten oxide particles, rubidium-doped tungsten oxide particles, and the like.

From the viewpoint of further heightening the heat shielding properties of the interlayer film and laminated glass, cesium-doped tungsten oxide particles are especially preferred. From the viewpoint of still further heightening the heat shielding properties of the interlayer film and laminated glass, it is preferred that the cesium-doped tungsten oxide particles be tungsten oxide particles represented by the formula: $Cs_{0.33}WO_3$.

The average particle diameter of the heat shielding particles is preferably greater than or equal to 0.01 μm, more preferably greater than or equal to 0.02 μm, preferably less than or equal to 0.1 μm and more preferably less than or equal to 0.05 μm. When the average particle diameter is greater than or equal to the above lower limit, the heat ray shielding properties are sufficiently heightened. When the average particle diameter is less than or equal to the above upper limit, the dispersibility of heat shielding particles is enhanced.

The "average particle diameter" refers to the volume average particle diameter. The average particle diameter can be measured using a particle size distribution measuring apparatus ("UPA-EX150" available from NIKKISO CO., LTD.), or the like.

In the case where the first resin layer or the second resin layer contains the heat shielding particles, in 100% by weight of each of the first resin layer and the second resin layer, the content of the heat shielding particles is preferably greater than or equal to 0.01% by weight, more preferably greater than or equal to 0.1% by weight, further preferably greater than or equal to 1% by weight, especially preferably greater than or equal to 1.5% by weight, preferably less than or equal to 6% by weight, more preferably less than or equal to 5.5% by weight, further preferably less than or equal to 4% by weight, especially preferably less than or equal to 3.5% by weight and most preferably less than or equal to 3.0% by weight. When the content of the heat shielding particles is greater than or equal to the above lower limit and less than or equal to the above upper limit, the heat shielding properties are sufficiently heightened and the visible light transmittance is sufficiently heightened.

In the case where the first resin layer or the second resin layer contains the heat shielding particles, it is preferred that each of the first resin layer and the second resin layer contain the heat shielding particles in a proportion of 0.1 to 12 g/m$^2$. In the case where the proportion of the heat shielding particles lies within the above-mentioned range, the heat shielding properties are sufficiently heightened and the visible light transmittance is sufficiently heightened. The proportion of the heat shielding particles is preferably greater than or equal to 0.5 g/m$^2$, more preferably greater than or equal to 0.8 g/m$^2$, further preferably greater than or equal to 1.5 g/m$^2$, especially preferably greater than or equal to 3 g/m$^2$, preferably less than or equal to 11 g/m$^2$, more preferably less than or equal to 10 g/m$^2$, further preferably less than or equal to 9 g/m$^2$ and especially preferably less than or equal to 7 g/m$^2$. When the proportion is greater than or equal to the above lower limit, the heat shielding properties are further heightened. When the proportion is less than or equal to the above upper limit, the visible light transmittance is further heightened.

[Ultraviolet Ray Screening Agent]

It is preferred that the first resin layer contain an ultraviolet ray screening agent. It is preferred that the second resin layer contain an ultraviolet ray screening agent. It is more preferred that both of the first resin layer and the second resin layer contain an ultraviolet ray screening agent. By the use of an ultraviolet ray screening agent, even when the interlayer film and the laminated glass are used for a long period of time, the visible light transmittance becomes further difficult to be lowered. One kind of the ultraviolet ray screening agent may be used alone, and two or more kinds thereof may be used in combination.

The ultraviolet ray screening agent include an ultraviolet ray absorber. It is preferred that the ultraviolet ray screening agent be an ultraviolet ray absorber.

Examples of a common ultraviolet ray screening agent which is heretofore widely known include a metal-based ultraviolet ray screening agent, a metal oxide-based ultraviolet ray screening agent, a benzotriazole-based ultraviolet ray screening agent (a benzotriazole compound), a benzophenone-based ultraviolet ray screening agent (a benzophenone compound), a triazine-based ultraviolet ray screening agent (a triazine compound), a malonic acid ester-based ultraviolet ray screening agent (a malonic acid ester compound), an oxanilide-based ultraviolet ray screening agent (an oxanilide compound), a benzoate-based ultraviolet ray screening agent (a benzoate compound) and the like.

Examples of the metal-based ultraviolet ray screening agent include platinum particles, particles in which the surface of platinum particles is coated with silica, palladium particles, particles in which the surface of palladium particles is coated with silica, and the like. It is preferred that the ultraviolet ray screening agent not be heat shielding particles.

Examples of the metal oxide-based ultraviolet ray screening agent include zinc oxide, titanium oxide, cerium oxide and the like. Furthermore, with regard to the metal oxide-based ultraviolet ray screening agent, the surface thereof may be coated. Examples of a coating material for the surface of the metal oxide-based ultraviolet ray screening agent include an insulating metal oxide, a hydrolyzable organosilicon compound, a silicone compound and the like.

Examples of the insulating metal oxide include silica, alumina, zirconia and the like. For example, the insulating metal oxide has a band-gap energy greater than or equal to 5.0 eV.

Examples of the benzotriazole-based ultraviolet ray screening agent include benzotriazole-based ultraviolet ray screening agents such as 2-(2'-hydroxy-5'-methylphenyl) benzotriazole ("Tinuvin P" available from BASF Japan Ltd.), 2-(2'-hydroxy-3',5'-di-t-butylphenyl)benzotriazole ("Tinuvin 320" available from BASF Japan Ltd.), 2-(2'-hydroxy-3'-t-butyl-5-methylphenyl)-5-chlorobenzotriazole ("Tinuvin 326" available from BASF Japan Ltd.) and 2-(2'-hydroxy-3',5'-di-amylphenyl)benzotriazole ("Tinuvin 328" available from BASF Japan Ltd.). It is preferred that the benzotriazole-based ultraviolet ray screening agent be a benzotriazole-based ultraviolet ray screening agent containing halogen atoms, and it is more preferred that the ultraviolet ray screening agent be a benzotriazole-based ultraviolet ray screening agent containing chlorine atoms, since those are excellent in ultraviolet ray absorbing performance.

Examples of the benzophenone-based ultraviolet ray screening agent include octabenzone ("Chimassorb 81" available from BASF Japan Ltd.) and the like.

Examples of the triazine-based ultraviolet ray screening agent include 2-(4,6-diphenyl-1,3,5-triazine-2-yl)-5-[(hexyl)oxy]-phenol ("Tinuvin 1577FF" available from BASF Japan Ltd.) and the like.

Examples of the malonic acid ester-based ultraviolet ray screening agent include dimethyl-2-(p-methoxybenzylidene)malonate, tetraethyl-2,2-(1,4-phenylenedimethylidyne)bismalonate, 2-(p-methoxybenzylidene)-bis(1,2,2,6,6-pentamethyl-4-piperidinyl)malonate and the like.

Examples of a commercial product of the malonic acid ester-based ultraviolet ray screening agent include Hostavin B-CAP, Hostavin PR-25 and Hostavin PR-31 (any of these is available from Clariant Japan K.K.).

Examples of the oxanilide-based ultraviolet ray screening agent include a kind of oxalic acid diamide having a substituted aryl group and the like on the nitrogen atom such as N-(2-ethylphenyl)-N'-(2-ethoxy-5-t-butylphenyl)oxalic acid diamide, N-(2-ethylphenyl)-N'-(2-ethoxy-phenyl)oxalic acid diamide and 2-ethyl-2'-ethoxy-oxanilide ("Sanduvor VSU" available from Clariant Japan K.K.).

Examples of the benzoate-based ultraviolet ray screening agent include 2,4-di-tert-butylphenyl-3,5-di-tert-butyl-4-hydroxybenzoate ("Tinuvin 120" available from BASF Japan Ltd.) and the like.

With regard to the interlayer film and laminated glass, in order to suppress the lowering in visible light transmittance thereof after the lapse of time, it is preferred that the ultraviolet ray screening agent be 2-(2'-hydroxy-3'-t-butyl-5-methylphenyl)-5-chlorobenzotriazole ("Tinuvin 326" available from BASF Japan Ltd.) or 2-(2'-hydroxy-3',5'-di-amylphenyl)benzotriazole ("Tinuvin 328" available from BASF Japan Ltd.), and the ultraviolet ray screening agent may be 2-(2'-hydroxy-3'-t-butyl-5-methylphenyl)-5-chlorobenzotriazole.

In the case where each of the first resin layer and the second resin layer contains the ultraviolet ray screening agent, in 100% by weight of each of the first resin layer and the second resin layer, the content of the ultraviolet ray screening agent is preferably greater than or equal to 0.1% by weight, more preferably greater than or equal to 0.2% by weight, further preferably greater than or equal to 0.3% by weight, especially preferably greater than or equal to 0.5% by weight, preferably less than or equal to 2.5% by weight, more preferably less than or equal to 2% by weight, further preferably less than or equal to 1% by weight and especially preferably less than or equal to 0.8% by weight. When the content of the ultraviolet ray screening agent is greater than or equal to the above lower limit and less than or equal to the above upper limit, the lowering in visible light transmittance after the lapse of time is further suppressed. In particular, by allowing the content of the ultraviolet ray screening agent to be greater than or equal to 0.2% by weight in 100% by weight of each of the first resin layer and the second resin layer, with regard to the interlayer film and laminated glass, the lowering in visible light transmittance thereof after the lapse of time can be significantly suppressed.

[Oxidation Inhibitor]

It is preferred that the first resin layer contain an oxidation inhibitor. It is preferred that the second resin layer contain an oxidation inhibitor. It is preferred that both of the first resin layer and the second resin layer contain an oxidation inhibitor. One kind of the oxidation inhibitor may be used alone, and two or more kinds thereof may be used in combination.

Examples of the oxidation inhibitor include a phenol-based oxidation inhibitor, a sulfur-based oxidation inhibitor, a phosphorus-based oxidation inhibitor and the like. The phenol-based oxidation inhibitor is an oxidation inhibitor having a phenol skeleton. The sulfur-based oxidation inhibitor is an oxidation inhibitor containing a sulfur atom. The phosphorus-based oxidation inhibitor is an oxidation inhibitor containing a phosphorus atom.

It is preferred that the oxidation inhibitor be a phenol-based oxidation inhibitor or a phosphorus-based oxidation inhibitor.

Examples of the phenol-based oxidation inhibitor include 2,6-di-t-butyl-p-cresol (BHT), butylated hydroxyanisole (BHA), 2,6-di-t-butyl-4-ethylphenol, stearyl-β-(3,5-di-t-butyl-4-hydroxyphenyl)propionate, 2,2'-methylenebis-(4-methyl-6-butylphenol), 2,2'-methylenebis-(4-ethyl-6-t-butylphenol), 4,4'-butylidene-bis-(3-methyl-6-t-butylphenol), 1,1,3-tris-(2-methyl-hydroxy-5-t-butylphenyl)butane, tetrakis[methylene-3-(3',5'-butyl-4-hydroxyphenyl)propionate] methane, 1,3,3-tris-(2-methyl-4-hydroxy-5-t-butylphenol) butane, 1,3,5-trimethyl-2,4,6-tris(3,5-di-t-butyl-4-hydroxybenzyl)benzene, bis(3,3'-t-butylphenol)butyric acid glycol ester, bis(3-t-butyl-4-hydroxy-5-methylbenzenepropanoic acid)ethylenebis(oxyethylene), and the like. One kind or two or more kinds among these oxidation inhibitors are suitably used.

Examples of the phosphorus-based oxidation inhibitor include tridecyl phosphite, tris(tridecyl) phosphite, triphenyl phosphite, trinonylphenyl phosphite, bis(tridecyl)pentaerithritol diphosphite, bis(decyl)pentaerithritol diphosphite, tris(2,4-di-t-butylphenyl)phosphite, bis(2,4-di-t-butyl-6-methylphenyl)ethyl ester phosphorous acid, tris(2,4-di-t-butylphenyl)phosphite, 2,2'-methylenebis(4,6-di-t-butyl-1- phenyloxy)(2-ethylhexyloxy)phosphorus, and the like. One kind or two or more kinds among these oxidation inhibitors are suitably used.

Examples of a commercial product of the oxidation inhibitor include "IRGANOX 245" available from BASF Japan Ltd., "IRGAFOS 168" available from BASF Japan Ltd., "IRGAFOS 38" available from BASF Japan Ltd., "Sumilizer BHT" available from Sumitomo Chemical Co., Ltd., "IRGANOX 1010" available from BASF Japan Ltd., and the like.

In the case where each of the first resin layer and the second resin layer contains the oxidation inhibitor, in 100% by weight of each of the first resin layer and the second resin layer, the content of the oxidation inhibitor is preferably greater than or equal to 0.1% by weight, preferably less than or equal to 2% by weight and more preferably less than or equal to 1.8% by weight. When the content of the oxidation inhibitor is greater than or equal to the above lower limit, with regard to the interlayer film and laminated glass, high visible light transmittance thereof is maintained over a longer period of time. When the content of the oxidation inhibitor is less than or equal to the above upper limit, an effect commensurate with the addition of an oxidation inhibitor becomes easy to be attained.

[Other Ingredients]

Each of the first resin layer and the second resin layer may include additives such as a light stabilizer, a flame retardant, an antistatic agent, a pigment, a dye, an adhesive force regulating agent, a moisture-resistance improving agent and a fluorescent brightening agent, as necessary. One kind of these additives may be used alone, and two or more kinds thereof may be used in combination.

(Other Details of Interlayer Film for Laminated Glass)

It is preferred that the interlayer film for laminated glass be arranged between a first laminated glass member and a second laminated glass member to be used.

The thickness of the interlayer film for laminated glass is not particularly limited. From the viewpoint of the practical aspect and the viewpoint of sufficiently heightening the heat shielding properties, the thickness of the interlayer film is preferably greater than or equal to 0.1 mm, more preferably greater than or equal to 0.25 mm, preferably less than or equal to 3 mm and more preferably less than or equal to 1.5 mm. When the thickness of the interlayer film is greater than or equal to the above lower limit, the penetration resistance of laminated glass is enhanced.

The thickness of the plastic layer is preferably greater than or equal to 5 µm, more preferably greater than or equal to 30 µm, preferably less than or equal to 300 µm and more preferably less than or equal to 150 µm. When the thickness of the plastic layer is greater than or equal to the above lower limit, the Young's modulus of the plastic layer is effectively heightened, the processability at the time of preparing laminated glass is further enhanced and laminated glass is further allowed to generate smaller broken pieces of glass at the time of breakage thereof. When the thickness of the plastic layer is less than or equal to the above upper limit, the thicknesses of the first resin layer and the second resin layer can be made relatively thick and the performance derived from the first resin layer and the second resin layer can be further exerted.

The thickness of each of the first resin layer and the second resin layer is preferably greater than or equal to 0.1 mm, more preferably greater than or equal to 0.2 mm, further preferably greater than or equal to 0.25 mm, especially preferably greater than or equal to 0.3 mm, preferably less than or equal to 1.0 mm, more preferably less than or equal to 0.6 mm, still more preferably less than or equal to 0.5 mm, further preferably less than or equal to 0.45 mm and especially preferably less than or equal to 0.4 mm. When the thickness of each of the first resin layer and the second resin layer is greater than or equal to the above lower limit, the penetration resistance of laminated glass is further enhanced. When the thickness of each of the first resin layer and the second resin layer is less than or equal to the above upper limit, the transparency of laminated glass is further enhanced.

(Production Method of Interlayer Film for Laminated Glass)

The preferred production method of the interlayer film for laminated glass according to the present invention includes the step of using a plastic layer with a Young's modulus of higher than or equal to 1 GPa and a first resin layer with a ten-point average roughness Rz of less than or equal to 45 µm measured in accordance with JIS B0601-1982 on the surface of one side abutted to the plastic layer and subjecting the first resin layer and the plastic layer to thermocompression bonding to obtain an interlayer film for laminated glass which is provided with the plastic layer and the first resin layer layered on a first surface of the plastic layer, or the step of using a plastic layer with a Young's modulus of higher than or equal to 1 GPa, a first resin layer with a ten-point average roughness Rz of less than or equal to 45 µm measured in accordance with JIS B0601-1982 on the surface of one side abutted to the plastic layer and a second resin layer with a ten-point average roughness Rz of less than or equal to 45 µm measured in accordance with JIS B0601-1982 on the surface of one side abutted to the plastic layer and subjecting the first resin layer, the plastic layer and the second resin layer to thermocompression bonding to obtain an interlayer film for laminated glass which is provided with the plastic layer, the first resin layer layered on a first surface of the plastic layer and the second resin layer layered on a second surface opposite to the first surface of the plastic layer.

The preferred production method of the interlayer film for laminated glass according to the present invention includes the step of subjecting the plastic layer and the first resin layer to thermocompression bonding by a roll-to-roll process under conditions of a heating temperature of higher than or equal to 65° C. and lower than or equal to 150° C., a pressure at the time of compression bonding of greater than or equal to 0.1 kN and less than or equal to 5 kN and a tensile force at the time of transportation of less than or equal to 100 N to obtain an interlayer film for laminated glass which is provided with the plastic layer and the first resin layer layered on a first surface of the plastic layer, or the step of subjecting the plastic layer, the first resin layer and the second resin layer to thermocompression bonding by a roll-to-roll process under conditions of a heating temperature of higher than or equal to 65° C. and lower than or equal to 150° C., a pressure at the time of compression bonding of greater than or equal to 0.1 kN and less than or equal to 5 kN and a tensile force at the time of transportation of less than or equal to 100 N to obtain an interlayer film for laminated glass which is provided with the plastic layer, the first resin layer layered on a first surface of the plastic layer and the second resin layer layered on a second surface opposite to the first surface of the plastic layer.

The Young's modulus of the plastic layer is higher than or equal to 1 GPa. In the production method of the interlayer film for laminated glass according to the present invention, it is preferred that the Young's modulus of the plastic layer be higher than the Young's modulus of the first resin layer.

The adhesive force between the plastic layer and the first resin layer, which is measured in accordance with JIS K6854-2, is made preferably greater than or equal to 1 N/50 mm and preferably less than or equal to 20 N/50 mm.

In the case where the interlayer film is provided with the second resin layer, it is preferred that the Young's modulus of the plastic layer be higher than the Young's modulus of the second resin layer. In the case where the interlayer film is provided with the second resin layer, the adhesive force between the plastic layer and the second resin layer, which is measured in accordance with JIS K6854-2, is made preferably greater than or equal to 1 N/50 mm and preferably less than or equal to 20 N/50 mm.

Incidentally, at the time of obtaining laminated glass by allowing a plastic layer containing polyethylene terephthalate and the like to be arranged on one surface of a resin layer or by allowing the plastic layer to be arranged between two resin layers and furthermore allowing laminated glass members such as glass plates to be arranged on respective outer surfaces of the two resin layers, an autoclave can be used. However, in the case where an autoclave is used, an interlayer film is poor in handling properties, the lamination requires much labor, and there tends to occur a problem on handling. In contrast, by adopting the above-mentioned configuration of the production method of an interlayer film for laminated glass in the present invention, it is possible to enhance the processability and allow laminated glass to generate smaller broken pieces of glass at the time of breakage thereof.

In this connection, in the case where an interlayer film provided with the first resin layer, the plastic layer and the second resin layer is obtained, the three layers may be layered at one time, and two layers are layered and then the remaining layer may be layered.

The heating temperature is preferably higher than or equal to 65° C. and preferably lower than or equal to 150° C. When the heating temperature is higher than or equal to the above lower limit, the adhesivity of each of the first resin layer and the second resin layer to the plastic layer is further improved. When the heating temperature is lower than or equal to the above upper limit, softening of the first resin layer and the second resin layer is suppressed and the lamination properness is further improved.

The pressure at the time of compression bonding is preferably greater than or equal to 0.1 kN and preferably less than or equal to 5 kN. When the pressure at the time of compression bonding is greater than or equal to the above lower limit, the adhesivity of each of the first resin layer and the second resin layer to the plastic layer is further improved. When the pressure at the time of compression bonding is less than or equal to the above upper limit, the occurrence of lamination wrinkles is suppressed and the lamination properness is further improved.

The tensile force at the time of transportation is preferably greater than or equal to 10 N, preferably less than or equal to 200 N and more preferably less than or equal to 100 N. For the purpose of obtaining the interlayer film for laminated glass according to the present invention, the tensile force at the time of transportation may be less than or equal to 200 N, but it is preferred that the tensile force at the time of transportation be less than or equal to 100 N. When the tensile force at the time of transportation is greater than or equal to the above lower limit, the slack at the time of transportation of the first resin layer, the second resin layer and the plastic layer in a lamination process is suppressed, wrinkles of layers at the time of being bonded together are suppressed and the lamination properness is further improved. When the tensile force at the time of transportation is less than or equal to the above upper limit, the elongation of the first resin layer and the second resin layer is suppressed, the variation in film width is suppressed and the lamination properness is further improved.

Moreover, as the production method of the plastic layer, the first resin layer and the second resin layer, a conventionally known method can be used. Examples thereof include a production method of kneading respective ingredients described above and forming the kneaded product into respective layers, and the like. A production method of extrusion-molding is preferred because the method is suitable for continuous production.

The method for kneading is not particularly limited. Examples of this method include a method using an extruder, a plastograph, a kneader, a banbury mixer, a calender roll, or the like. Of these, a method using an extruder is preferred and a method using a twin screw extruder is more preferred because the methods are suitable for continuous production.

Because the interlayer film is allowed to be excellent in production efficiency, it is preferred that respective polyvinyl acetal resins contained in the first resin layer and the second resin layer be the same as each other, it is more preferred that respective polyvinyl acetal resins contained therein be the same as each other and respective plasticizers contained therein be the same as each other, and it is further preferred that the first resin layer and the second resin layer be formed from the same resin composition as each other.

(Laminated Glass)

The laminated glass according to the present invention is provided with a first laminated glass member, a second laminated glass member and an interlayer film for laminated glass described above. The interlayer film for laminated glass is arranged between the first laminated glass member and the second laminated glass member. The first laminated glass member is arranged on the outside of the first resin layer in the interlayer film. The second laminated glass member is arranged on the outside of the second resin layer in the interlayer film. In this connection, in the case where the interlayer film is not provided with the second resin layer, the second laminated glass member may be layered on a surface opposite to the first resin layer of the plastic layer.

FIG. 2 shows an example of laminated glass prepared with an interlayer film for laminated glass in accordance with one embodiment of the present invention represented as a sectional view.

Laminated glass 11 shown in FIG. 2 is provided with an interlayer film 1, a first laminated glass member 21 and a second laminated glass member 22. The interlayer film 1 is sandwiched between the first laminated glass member 21 and the second laminated glass member 22. The first laminated glass member 21 is layered on a first surface 1a of the interlayer film 1. The second laminated glass member 22 is layered on a second surface 1b opposite to the first surface 1a of the interlayer film 1. The first laminated glass member 21 is layered on an outer surface 3a of a first resin layer 3 in the interlayer film 1. The second laminated glass member 22 is layered on an outer surface 4a of a second resin layer 4 in the interlayer film 1.

Examples of the laminated glass member include a glass plate, a PET (polyethylene terephthalate) film, and the like. As the laminated glass, laminated glass in which an interlayer film is sandwiched between a glass plate and a PET film or the like, as well as laminated glass in which an interlayer film is sandwiched between two glass plates, is included. Laminated glass is a laminate provided with a glass plate, and it is preferred that at least one glass plate be used. It is preferred that each of the first laminated glass member and the second laminated glass member be a glass plate or a PET (polyethylene terephthalate) film and the interlayer film include at least one glass plate as the first laminated glass member or the second laminated glass member. It is especially preferred that both of the first laminated glass member and the second laminated glass member be glass plates.

Examples of the glass plate include a sheet of inorganic glass and a sheet of organic glass. Examples of the inorganic glass include float plate glass, heat ray-absorbing plate glass, heat ray-reflecting plate glass, polished plate glass, figured glass, wired plate glass, green glass and the like. The organic glass is synthetic resin glass substituted for inorganic glass. Examples of the organic glass include a polycarbonate plate, a poly(meth)acrylic resin plate, and the like. Examples of the poly(meth)acrylic resin plate include a polymethyl (meth) acrylate plate, and the like.

Although respective thicknesses of the first laminated glass member and the second laminated glass member are not particularly limited, the thickness is preferably greater than or equal to 1 mm and preferably less than or equal to 5 mm. In the case where the laminated glass member is a glass plate, the thickness of the glass plate is preferably greater than or equal to 1 mm and preferably less than or equal to 5 mm. In the case where the laminated glass member is a PET film, the thickness of the PET film is preferably greater than or equal to 0.03 mm and preferably less than or equal to 0.5 mm.

The production method of the laminated glass is not particularly limited. For example, an interlayer film mentioned above is sandwiched between the first and second laminated glass members, and the air remaining between the first laminated glass member and the interlayer film or the second laminated glass member and the interlayer film is removed by allowing the members to pass through a pressing roll or by putting the members into a rubber bag and allowing the contents to be sucked under reduced pressure. Afterward, the members are preliminarily bonded together at about 70 to 110° C. to obtain a laminate. Next, by putting the laminate into an autoclave or by pressing the laminate, the members are press-bonded together at about 120 to 150° C. and under a pressure of 1 to 1.5 MPa. In this way, laminated glass can be obtained.

The laminated glass can be used for automobiles, railway vehicles, aircraft, ships, buildings and the like. It is preferred that the laminated glass be laminated glass for building or for vehicles, and it is more preferred that the laminated glass be laminated glass for vehicles. The laminated glass can also be used for applications other than these applications. The laminated glass can be used for a windshield, side glass, rear glass or roof glass of an automobile and the like. Since the laminated glass is high in heat shielding properties and high in visible light transmittance, the laminated glass is suitably used for automobiles.

Hereinafter, the present invention will be described in more detail with reference to examples. The present invention is not limited only to the following examples.

(Materials for First Resin Layer and Second Resin Layer)
Thermoplastic Resin:
Polyvinyl butyral resin (PVB1) (the content of the hydroxyl group of 22% by mole, the acetylation degree of 13% by mole, the butyralization degree of 65% by mole, the average polymerization degree of 2300)
Polyvinyl butyral resin (PVB2) (the content of the hydroxyl group of 30.5% by mole, the acetylation degree of 1% by mole, the butyralization degree of 68.5% by mole, the average polymerization degree of 1700)
Plasticizer:
3GO (triethylene glycol di-2-ethylhexanoate)
Other Ingredients:
BHT (an oxidation inhibitor, 2,6-di-t-butyl-p-cresol)
T-326 (an ultraviolet ray screening agent, 2-(2'-hydroxy-3'-t-butyl-5-methylphenyl)-5-chlorobenzotriazole, "Tinuvin 326" available from BASF Japan Ltd.)
ITO particles (tin-doped indium oxide particles)
A phthalocyanine compound ("NIR-43V" available from YAMADA CHEMICAL CO., LTD.)
CWO particles (cesium-doped tungsten oxide particles)
(Resin Layer)
Resin Layer a (First Resin Layer):
To 100 parts by weight of a polyvinyl butyral resin (PVB1), 40 parts by weight of a plasticizer (3GO), 0.5 part by weight of an ultraviolet ray screening agent (T-326) and 0.5 part by weight of an oxidation inhibitor (BHT) were added and thoroughly kneaded with a mixing roll to obtain a composition. The composition obtained was extruded by an extruder to obtain a single-layered resin layer with a thickness of 380 μm. Moreover, the surface of one side, which is abutted to a plastic layer, of the resin layer was embossed to obtain a resin layer A with a ten-point average roughness Rz of 35 μm measured in accordance with JIS B0601-1982 on the embossed surface.

Resin Layer B (First Resin Layer):
A resin layer B was obtained in the same manner as that for the resin layer A except that the emboss processing condition was changed so as to allow the ten-point average roughness Rz on the surface of one side, which is abutted to a plastic layer, of the resin layer to become 45 μm.

Resin Layer C (First Resin Layer):
A resin layer C was obtained in the same manner as that for the resin layer A except that the emboss processing condition was changed so as to allow the ten-point average roughness Rz on the surface of one side, which is abutted to a plastic layer, of the resin layer to become 55 μm.

Resin Layer D (First Resin Layer):
A resin layer D was obtained in the same manner as that for the resin layer A except that the polyvinyl butyral resin (PVB1) was changed to a polyvinyl butyral resin (PVB2) and the emboss processing condition was changed so as to allow the ten-point average roughness Rz on the surface of one side, which is abutted to a plastic layer, of the resin layer to become 38 μm.

Resin Layer E (First Resin Layer):
A resin layer E was obtained in the same manner as that for the resin layer D except that 1.166 parts by weight of ITO particles and 0.013 part by weight of a phthalocyanine compound were further blended relative to the polyvinyl butyral resin (PVB2) and the emboss processing condition was changed so as to allow the ten-point average roughness Rz on the surface of one side, which is abutted to a plastic layer, of the resin layer to become 40 μm.

Resin Layer F (First Resin Layer):
A resin layer F was obtained in the same manner as that for the resin layer D except that 1.166 parts by weight of ITO particles, 0.013 part by weight of a phthalocyanine compound and 0.056 part by weight of CWO particles were further blended relative to the polyvinyl butyral resin (PVB2) and the emboss processing condition was changed so as to allow the ten-point average roughness Rz on the surface of one side, which is abutted to a plastic layer, of the resin layer to become 20 μm.

Resin Layer G (First Resin Layer):

To 100 parts by weight of a polyvinyl butyral resin (PVB2), 40 parts by weight of a plasticizer (3GO), 0.5 part by weight of an ultraviolet ray screening agent (T-326) and 0.5 part by weight of an oxidation inhibitor (BHT) were added and thoroughly kneaded with a mixing roll to obtain a composition X. Moreover, a composition Y was obtained in the same manner as that for the composition X except that the blending amount of the plasticizer (3GO) relative to 100 parts by weight of the polyvinyl butyral resin (PVB1) was changed to 60 parts by weight. The composition X and composition Y obtained were extruded by a coextruder to obtain a three-layered resin layer in which a layer of the composition X with a thickness of 350 μm, a layer of the composition Y with a thickness of 100 μm and a layer of the composition X with a thickness of 350 μm are layered in this order. Moreover, the surface of one side, which is abutted to a plastic layer, of the resin layer was embossed to obtain a resin layer G with a ten-point average roughness Rz of 32 μm measured in accordance with JIS B0601-1982 on the embossed surface.

Resin Layer H (First Resin Layer):

A resin layer H was obtained in the same manner as that for the resin layer D except that the emboss processing condition was changed so as to allow the ten-point average roughness Rz on the surface of one side, which is abutted to a plastic layer, of the resin layer to become 40 μm and the resin layer was allowed to have a thickness of 760 μm.

Resin Layer (Second Resin Layer)

To 100 parts by weight of a polyvinyl butyral resin (PVB1), 40 parts by weight of a plasticizer (3GO), 0.5 part by weight of an ultraviolet ray screening agent (T-326) and 0.5 part by weight of an oxidation inhibitor (BHT) were added and thoroughly kneaded with a mixing roll to obtain a composition. The composition obtained was extruded by an extruder to obtain a single-layered resin layer with a thickness of 380 μm. Moreover, the surface of one side, which is abutted to a plastic layer, of the resin layer was embossed to obtain a second resin layer with a ten-point average roughness Rz of 35 μm measured in accordance with JIS B0601-1982 on the embossed surface.

(Plastic Layer)

Plastic layer A (a polyethylene terephthalate film, "U34 Lumirror" available from Toray Industries, Inc., 100 μm in thickness)

EXAMPLES 1 TO 12 AND COMPARATIVE EXAMPLES 1 AND 2

(1) Preparation of Interlayer Film

In Examples 1 to 12 and Comparative Examples 1 and 2, a kind of the plastic layer and a kind of the first resin layer shown in the following Tables 1 and 2 were layered to prepare an interlayer film having a two-layer structure.

Using a thermocompression bonding laminator ("MRK-650Y Type" available from MCK CO., LTD.), thermocompression bonding was performed by a roll-to-roll process under conditions of a heating temperature, a pressure at the time of compression bonding and a tensile force at the time of transportation shown in the following Tables 1 and 2. Moreover, the material qualities of an upper side-laminate roll and a lower side-laminate roll used for thermocompression bonding were set to those listed in the following Table 1.

(2) Preparation of Laminated Glass

The interlayer film obtained was cut into a size of 30 cm in longitudinal length by 30 cm in transversal length. Moreover, two sheets of clear glass (30 cm in longitudinal length by 30 cm in transversal length by 2.5 mm in thickness) were prepared. The interlayer film obtained, and each first resin layer and each second resin layer which are used in Examples 1 to 12 and Comparative Examples 1 and 2, were sandwiched, in the order of the first resin layer, the plastic layer and the second resin layer, between the two sheets of clear glass, held in place for 30 minutes at 90° C. and pressed under vacuum with a vacuum laminator to obtain a laminate. With regard to the laminate, interlayer film portions protruded from the glass plate were cut away to obtain a sheet of laminated glass. In this connection, in the laminated glass, a sheet of clear glass, the first resin layer, the plastic layer, the second resin layer and a sheet of clear glass are layered in this order.

EXAMPLES 13 AND 14

(1) Preparation of Interlayer Film

In Examples 13 and 14, an interlayer film having a three-layer structure of a first resin layer, a plastic layer and a second resin layer was prepared.

Using a thermocompression bonding laminator ("MRK-650Y Type" available from MCK CO., LTD.), thermocompression bonding was performed by a roll-to-roll process under conditions of a heating temperature, a pressure at the time of compression bonding and a tensile force at the time of transportation shown in the following Table 3 to allow a kind of the first resin layer, a kind of the plastic layer and a kind of the second resin layer shown in the following Table 3 to be layered, and an interlayer film was obtained.

(2) Preparation of Laminated Glass

The interlayer film obtained was cut into a size of 30 cm in longitudinal length by 30 cm in transversal length. Moreover, two sheets of clear glass (30 cm in longitudinal length by 30 cm in transversal length by 2.5 mm in thickness) were prepared. The interlayer film was sandwiched between the two sheets of clear glass, held in place for 30 minutes at 90° C. and pressed under vacuum with a vacuum laminator to obtain a laminate. With regard to the laminate, interlayer film portions protruded from the glass plate were cut away to obtain a sheet of laminated glass.

(Evaluation)

(1) Young's Modulus

The Young's moduli of the plastic layer and the first resin layer were measured in the following manner.

The tensile test in accordance with JIS K7127 was performed to obtain a strain-stress curve at 23° C. The Young's modulus defined by the inclination of a straight line portion of the strain-stress curve obtained was evaluated.

(2) Lamination Properties

After a first resin layer was layered, the lamination state of the first resin layer was visually observed to be evaluated. The lamination properties were judged according to the following criteria.

[Criteria for Judgment in Lamination Properties]

Circle: There are no defects in appearance due to wrinkles when visually observed.

X mark: There are defects in appearance due to wrinkles when visually observed.

(3) Proportion of the Length of Non-Adhesive Portion Between Plastic Layer and Resin Layer The interlayer film obtained was cut in the thickness direction with a cryo-microtome under an environment of 23° C. to expose a section in the thickness direction. Next, the state of a first lamination interface between the plastic layer and the first resin layer exposed on the section was observed at 150 magnifications with a field emission type scanning electron microscope (FE-SEM, "S-4800" available from Hitachi High-Technologies Corporation, the acceleration voltage of 0.7 kV). The whole length of the plastic layer in the first lamination interface (the length of the observed portion of 800 μm) and the length of a portion, which is not brought into contact with the first resin layer, of the plastic layer in the first lamination interface were evaluated. The proportion of the length of a portion, which is not brought into contact with the first resin layer, (the proportion (1) of the length of the non-contact portion) of the plastic layer in the first lamination interface to 100% of the whole length of the plastic layer in the first lamination interface was determined. Similarly, the proportion of the length of a portion, which is not brought into contact with the second resin layer, (the proportion (2) of the length of the non-contact portion) of the plastic layer in the second lamination interface was also determined.

(4) Adhesive Force

Using the TENSILON universal material testing machine ("RTM-500" available from ORIENTEC CORPORATION), the plastic layer and the first resin layer were measured for the adhesive force therebetween at a speed of 500 ram/min at 23° C. in accordance with JIS K6854-2. In this connection, with regard to Examples 13 and 14, the plastic layer and the second resin layer were also evaluated for the adhesive force therebetween in the same manner.

(5) Handling Properties

The interlayer film obtained was cut into a size of 100 cm×100 cm. The cut interlayer film was grasped by hands at both ends thereof, and each of the front surface and back surface of the interlayer film was brought into contact with the top of a desk repeatedly 30 times continuously so that the front surface and the back surface are alternately abutted thereto to evaluate the handling properties. The handling properties were judged according to the following criteria.

[Criteria for Judgment in Handling Properties]

Circle: The interlayer film obtained in each of Examples 1 to 12 and Comparative Examples 1 and 2 is in a state of not causing exfoliation at all between the first resin layer and the plastic layer after the test, and the interlayer film obtained in each of Examples 13 and 14 is in a state of not causing exfoliation at all between the first resin layer and the plastic layer and between the second resin layer and the plastic layer after the test.

Triangle: The interlayer film obtained in each of Examples 1 to 12 and Comparative Examples 1 and 2 is in a state where exfoliation between the first resin layer and the plastic layer is confirmed at a portion with a distance of less than 10 mm from the end part after the test, and the interlayer film obtained in each of Examples 13 and 14 is in a state where at least one among exfoliation between the first resin layer and the plastic layer and exfoliation between the second resin layer and the plastic layer is confirmed at a portion with a distance of less than 10 mm from the end part after the test.

X mark: The interlayer film obtained in each of Examples 1 to 12 and Comparative Examples 1 and 2 is in a state where exfoliation between the first resin layer and the plastic layer is confirmed at a portion with a distance of greater than or equal to 10 mm from the end part after the test, and the interlayer film obtained in each of Examples 13 and 14 is in a state where at least one among exfoliation between the first resin layer and the plastic layer and exfoliation between the second resin layer and the plastic layer is confirmed at a portion with a distance of greater than or equal to 10 mm from the end part after the test.

The details and the results are shown in the following Tables 1 to 3.

TABLE 1

|  |  | Ex. 1 | Ex. 2 | Ex. 3 | Ex. 4 | Ex. 5 | Ex. 6 | Comp. Ex. 1 | Comp. Ex. 2 |
|---|---|---|---|---|---|---|---|---|---|
| First resin layer | Kind | A | A | B | B | A | A | C | C |
|  | Ten-point average roughness Rz(μm) | 35 | 35 | 45 | 45 | 35 | 35 | 55 | 55 |
|  | Young's modulus (GPa) | 0.004 | 0.004 | 0.004 | 0.004 | 0.004 | 0.004 | 0.004 | 0.004 |
| Plastic layer | Kind | A | A | A | A | A | A | A | A |
|  | Young's modulus (GPa) | 4.5 | 4.5 | 4.5 | 4.5 | 4.5 | 4.5 | 4.5 | 4.5 |
| Conditions for thermocompression bonding | Heating temperature (° C.) for first resin layer | 75 | 90 | 75 | 90 | 75 | 90 | 75 | 90 |
|  | Pressure (kN) at the time of compression bonding | 1.0 | 1.0 | 1.0 | 1.0 | 1.0 | 1.0 | 1 | 1 |
|  | Material quality of laminate roll (upper side) | Rubber | Rubber | Rubber | Rubber | Rubber | Rubber | Rubber | Rubber |
|  | Material quality of laminate roll (lower side) | Rubber | Rubber | Rubber | Rubber | Iron | Iron | Rubber | Rubber |
|  | Tensile force (N) at the time of transportation | 8 | 8 | 8 | 8 | 8 | 8 | 8 | 8 |
| Lamination properties |  | ○ | ○ | ○ | ○ | ○ | ○ | ○ | ○ |
| Proportion (1) of the length of non-contact portion (%) |  | 40 | 20 | 50 | 30 | 10 | 5 | 80 | 78 |
| Adhesive force between plastic layer and first resin layer (N/50 mm) |  | 3.5 | 10.1 | 1.5 | 2.8 | 8.5 | 13.5 | 0.7 | 0.9 |
| Handling properties |  | ○ | ○ | ○ | ○ | ○ | ○ | x | x |

TABLE 2

|  |  | Ex. 7 | Ex. 8 | Ex. 9 | Ex. 10 | Ex. 11 | Ex. 12 |
|---|---|---|---|---|---|---|---|
| First resin layer | Kind | D | E | E | E | F | G |
|  | Ten-point average roughness Rz(μm) | 38 | 40 | 40 | 40 | 20 | 32 |
|  | Young's modulus (GPa) | 0.007 | 0.013 | 0.013 | 0.013 | 0.013 | 0.006 |
| Plastic layer | Kind | A | A | A | A | A | A |
|  | Young's modulus (GPa) | 4.5 | 4.5 | 4.5 | 4.5 | 4.5 | 4.5 |
| Conditions for thermocompression bonding | Heating temperature (° C.) for first resin layer | 75 | 75 | 85 | 90 | 75 | 85 |
|  | Pressure (kN) at the time of compression bonding | 1.0 | 1.0 | 1.0 | 1.0 | 1.0 | 1.0 |
|  | Material quality of laminate roll (upper side) | Rubber | Rubber | Rubber | Rubber | Rubber | Rubber |
|  | Material quality of laminate roll (lower side) | Rubber | Rubber | Rubber | Rubber | Rubber | Rubber |
|  | Tensile force (N) at the time of transportation | 8 | 8 | 8 | 8 | 8 | 8 |

TABLE 2-continued

|  | | Ex. 7 | Ex. 8 | Ex. 9 | Ex. 10 | Ex. 11 | Ex. 12 |
|---|---|---|---|---|---|---|---|
| Lamination properties | | ○ | ○ | ○ | ○ | ○ | ○ |
| Proportion (1) of the length of non-contact portion (%) | | 19 | 63 | 30 | 20 | 14 | 44 |
| Adhesive force between plastic layer and first resin layer (N/50 mm) | | 5.7 | 3.8 | 4.1 | 5.6 | 3.6 | 4.6 |
| Handling properties | | ○ | ○ | ○ | ○ | ○ | ○ |

TABLE 3

|  |  | Ex. 13 | Ex. 14 |
|---|---|---|---|
| First resin layer | Kind | G | H |
|  | Ten-point average roughness Rz (μm) | 32 | 40 |
|  | Young's modulus (GPa) | 0.006 | 0.006 |
| Plastic layer | Kind | A | A |
|  | Young's modulus (GPa) | 4.5 | 4.5 |
| Second resin layer | Kind | D | D |
|  | Ten-point average roughness Rz (μm) | 38 | 38 |
|  | Young's modulus (GPa) | 0.007 | 0.007 |
| Conditions for thermocompression bonding | Heating temperature (° C.) for first resin layer | 90 | 85 |
|  | Heating temperature (° C.) for second resin layer | 90 | 85 |
|  | Pressure (kN) at the time of compression bonding | 1.0 | 1.0 |
|  | Material quality of laminate roll (upper side) | Rubber | Rubber |
|  | Material quality of laminate roll (lower side) | Rubber | Rubber |
|  | Tensile force (N) at the time of transportation | 8 | 8 |
| Lamination properties | | ○ | ○ |
| Proportion (1) of the length of non-contact portion (%) | | 21 | 44 |
| Proportion (2) of the length of non-contact portion (%) | | 8.7 | 6.1 |
| Adhesive force between plastic layer and first resin layer (N/50 mm) | | 6.3 | 4.6 |
| Adhesive force between plastic layer and second resin layer (N/50 mm) | | 8.4 | 6.1 |
| Handling properties | | ○ | ○ |

EXPLANATION OF SYMBOLS

1: Interlayer film
1a: First surface
1b: Second surface
2: Plastic layer
2a: First surface
2b: Second surface
3: First resin layer
3a: Outer surface
4: Second resin layer
4a: Outer surface
11. Laminated glass
21: First laminated glass member
22: Second laminated glass member

The invention claimed is:

1. An interlayer film for laminated glass, comprising a plastic layer with a Young's modulus of higher than or equal to 1 GPa and a first resin layer layered on a first surface of the plastic layer, the first resin layer having a Young's modulus of lower than or equal to 0.05 GPa, and
being provided with a second resin layer layered on a second surface opposite to the first surface of the plastic layer or being provided with no second resin layer on a second surface opposite to the first surface of the plastic layer,
when a first interface between the plastic layer and the first resin layer on a section in a thickness direction of the interlayer film is observed, a proportion of a length of the plastic layer that is not in contact with the first resin layer is less than or equal to 75%, based upon 100% of a whole length of the plastic layer in the first interface.

2. The interlayer film for laminated glass according to claim 1, wherein in the case where the interlayer film is provided with the second resin layer, the Young's modulus of the plastic layer is higher than the Young's modulus of the second resin layer.

3. The interlayer film for laminated glass according to claim 1, wherein, in the case where the interlayer film is provided with the second resin layer, when a second interface between the plastic layer and the second resin layer on a section in the thickness direction of the interlayer film is observed, a proportion of a length of the plastic layer that is not in contact with the second resin layer is less than or equal to 75%, based upon 100% of a whole length of the plastic layer in the second interface.

4. The interlayer film for laminated glass according to claim 1, wherein the first resin layer contains a polyvinyl acetal resin and a plasticizer, and in the case where the interlayer film is provided with the second resin layer, the second resin layer contains a polyvinyl acetal resin and a plasticizer.

5. The interlayer film for laminated glass according to claim 1, wherein the first resin layer and the plastic layer are subjected to thermocompression bonding by a roll-to-roll process under conditions of a heating temperature of higher than or equal to 65° C. and lower than or equal to 150° C., a pressure at the time of compression bonding of greater than or equal to 0.1 kN and less than or equal to 5 kN and a tensile force during a step of transportation of the plastic layer in the roll-to-roll process of less than or equal to 100 N.

6. The interlayer film for laminated glass according to claim 1, being provided with the second resin layer.

7. The interlayer film for laminated glass according to claim 1, wherein the first resin layer contains an ultraviolet ray screening agent.

8. The interlayer film for laminated glass according to claim 1, being provided with the second resin layer,
wherein the second resin layer contains an ultraviolet ray screening agent.

9. The interlayer film for laminated glass according to claim 1, wherein the first resin layer contains an oxidation inhibitor.

10. The interlayer film for laminated glass according to claim 1, being provided with the second resin layer,
wherein the second resin layer contains an oxidation inhibitor.

11. A laminated glass, comprising a first laminated glass member, a second laminated glass member and an interlayer film for laminated glass according to claim 1, the interlayer film for laminated glass being arranged between the first laminated glass member and the second laminated glass member.

12. The interlayer film for laminated glass according to claim 7 wherein the content of the ultraviolet ray screening agent in the first resin layer is greater than or equal to 0.1% by weight and less than or equal to 2.5% by weight in 100% by weight of the first resin layer.

13. The interlayer film for laminated glass according to claim 1, wherein the plastic layer comprises two or more selected from the group consisting of a light stabilizer, a flame retardant, an antistatic agent, a pigment, a dye, an adhesive force regulating agent, a moisture-resistance improving agent, and a fluorescent brightening agent.

14. The interlayer film for laminated glass according to claim 6, wherein each of the first resin layer and the second resin layer comprises at least one selected from the group consisting of a phthalocyanine compound, a naphthalocyanine compound, and an anthracyanine compound.

* * * * *